UNITED STATES PATENT OFFICE.

OTTO LIEBKNECHT, OF FRANKFORT-ON-THE-MAIN, GERMANY, ASSIGNOR TO ROESSLER & HASSLACHER CHEMICAL COMPANY, OF NEW YORK, N. Y., A CORPORATION OF NEW YORK.

PROCESS OF MANUFACTURING ALKALI PERCARBONATES.

1,225,832.     Specification of Letters Patent.     Patented May 15, 1917.

No Drawing.    Application filed January 27, 1917. Serial No. 145,021.

*To all whom it may concern:*

Be it known that I, OTTO LIEBKNECHT, a subject of the German Emperor, and resident of Frankfort-on-the Main, Germany, have invented certain new and useful Improvements in Processes of Manufacturing Alkali Percarbonates, of which the following is a specification.

My present invention relates to the manufacture of alkali percarbonates, and particularly sodium percarbonate, from alkali carbonate and hydrogen peroxid. It is the object of my present invention to provide improvements whereby I am enabled to obtain the percarbonate directly in a solid condition. I attain this object by permitting the reaction to proceed in the presence of a restricted proportion of water. The success of this step could not be foreseen; it could not be presumed that it was possible to obtain such readily soluble salts as percarbonates from a watery solution directly in a solid condition.

The following example will illustrate my invention: When 1200 grams of crystalline sodium carbonate are incorporated with 1000 cubic centimeters of a solution of hydrogen peroxid containing approximately 20 per cent. of hydrogen peroxid, the sodium carbonate will immediately be transformed into crystalline percarbonate. As by this reaction an absorption of heat is caused, the mass congeals to an ice-cake which contains the crystalline percarbonate.

In practical working I prefer to prevent the mass from congealing by conducting into the same a corresponding amount of heat, the mixture of reaction being simultaneously stirred. By a simple filtering operation under the action of suction, a crystalline percarbonate is obtained, which I have ascertained by my investigations to correspond to the percarbonate as defined by Tanatar.

When starting from an alkali-carbonate poorer in water, instead of from crystalline sodium carbonate, a solution of hydrogen peroxid may be employed which has a corresponding larger quantity of water; this is of advantage because diluted $H_2O_2$ solutions are technically more readily obtainable. In practical operation in such a case, I gradually add 560 grams of soda containing 82 per cent. of sodium carbonate, to 1650 cubic centimeters of a solution of hydrogen peroxid containing 12 per cent. of hydrogen peroxid, the latter being stirred while the soda is added. A slight development of heat ensues which can be balanced by a corresponding cooling action. After some stirring, the crystalline percarbonate may be obtained by filtering the mass under suction.

I have discovered that it is of advantage to provide for the presence of stabilizing agents. As useful stabilizing agents I refer, for instance, to the silicates, such as magnesium-silicate, alkali-silicate, magnesium-alkali-silicate, and the like. There are other inorganic compounds which are capable of acting as stabilizing agents, as, for instance, the salts of magnesium, especially chlorid of magnesium. Of organic substances I have found gum-arabic to be a useful stabilizing agent. I prefer to incorporate the stabilizing agents with the mixture of reaction. It is of advantage to apply several stabilizing agents of different character, one of which may be added during the process of manufacture, while another is added to the finished salt. So, for instance, may the stabilizing agent, or some of the stabilizing agents, of an inorganic character be incorporated with the mixture of reaction, while gum-arabic is added to the finished salt. In a general sense, I may say that small proportions of stabilizing agents are required to produce the desired results.

In some cases, I have found it of advantage to facilitate the separation of the percarbonate by means of a salt, such as common salt. Sodium carbonate, too, proved to be able to produce such a separating effect.

By proceeding in accordance with the provisions of my present invention solid percarbonates of good stability are obtained directly.

What I claim as my invention and desire to secure by Letters Patent of the United States, is:—

1. A process of manufacturing alkali percarbonates, consisting in associating hydrogen peroxid with alkali-carbonate in the presence of such a restricted proportion of water as to insure the direct obtainment therefrom of solid percarbonates.

2. A process of manufacturing alkali percarbonates, consisting in associating hydrogen peroxid with alkali-carbonate by means of a restricted proportion of water so as to insure the direct obtainment of solid percarbonates therefrom, and simultaneously providing for the presence of stabilizing agents.

3. A process of manufacturing alkali percarbonates, consisting in associating hydrogen peroxid with alkali-carbonate by means of a restricted proportion of water so as to insure the direct obtainment of solid percarbonates therefrom, and simultaneously providing for the presence of stabilizing agents containing a silicate.

4. A process of manufacturing alkali percarbonates, consisting in associating hydrogen peroxid with alkali-carbonate by means of a restricted proportion of water so as to insure the direct obtainment of solid percarbonates therefrom, and simultaneously providing for the presence of stabilizing agents containing a magnesium silicate.

5. A process of manufacturing alkali percarbonates, consisting in associating hydrogen peroxid with alkali-carbonate by means of a restricted proportion of water so as to insure the direct obtainment of solid percarbonates therefrom, and simultaneously providing for the presence of stabilizing agents containing a silicate of magnesium and an alkali metal.

6. A process of manufacturing alkali percarbonates, consisting in associating hydrogen peroxid with alkali-carbonate by means of a restricted proportion of water, and providing for the presence of a displacing agent so as to insure the direct separation of crystalline percarbonates.

7. A process of manufacturing alkali percarbonates, consisting in incorporating alkali-carbonate with a solution of hydrogen peroxid containing a restricted proportion of water, and adding common salt thereto to facilitate the direct separation of the crystalline percarbonates.

8. A process of manufacturing alkali percarbonate, consisting in associating hydrogen peroxid with alkali-carbonate in the presence of a restricted proportion of water, adding a displacing agent to facilitate the direct separation of the crystalline percarbonate, and providing for the presence of stabilizing agents.

9. A process of manufacturing alkali percarbonate, consisting in associating hydrogen peroxid with alkali carbonate in the presence of a restricted proportion of water, adding a displacing agent to facilitate the direct separation of the crystalline percarbonate, and providing for the presence of stabilizing agents containing silicic acid.

10. A process of manufacturing alkali percarbonate, consisting in associating hydrogen peroxid with alkali-carbonate in the presence of a restricted proportion of water, adding a displacing agent to facilitate the direct separation of the crystalline percarbonate, and providing for the presence of stabilizing agents containing a silicate of magnesium.

11. A process of manufacturing alkali percarbonate, consisting in associating hydrogen peroxid with alkali carbonate in the presence of a restricted proportion of water, adding a displacing agent to facilitate the direct separation of the crystalline percarbonate, and providing for the presence of stabilizing agents containing a silicate of magnesium and an alkali metal.

In testimony whereof I have signed my name to this specification in the presence of two subscribing witnesses.

OTTO LIEBKNECHT.

Witnesses:
  JEAN GRUND,
  ELISE GRUND.